United States Patent
Gomez

(10) Patent No.: US 7,099,829 B2
(45) Date of Patent: Aug. 29, 2006

(54) METHOD OF DYNAMICALLY DISPLAYING SPEECH RECOGNITION SYSTEM INFORMATION

(75) Inventor: Felipe Gomez, Lake Worth, FL (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 09/992,816

(22) Filed: Nov. 6, 2001

(65) Prior Publication Data

US 2003/0088413 A1    May 8, 2003

(51) Int. Cl.
 *G10L 11/00* (2006.01)
 *G10L 21/00* (2006.01)
 *G06F 3/00* (2006.01)

(52) U.S. Cl. .................. 704/275; 704/270; 715/728

(58) Field of Classification Search ............. 704/231, 704/275, 235
See application file for complete search history.

(56) References Cited

U.S. PATENT DOCUMENTS

| | | | |
|---|---|---|---|
| 5,632,002 A | 5/1997 | Hashimoto et al. ......... 395/2.4 |
| 5,835,893 A | 11/1998 | Ushioda .................. 704/257 |
| 5,864,815 A | 1/1999 | Rozak et al. .............. 704/275 |
| 6,075,534 A * | 6/2000 | VanBuskirk et al. ........ 345/835 |
| 6,085,159 A * | 7/2000 | Ortega et al. .............. 704/235 |
| 6,100,882 A | 8/2000 | Sharman et al. ............ 345/320 |
| 6,122,613 A * | 9/2000 | Baker ...................... 704/275 |
| 6,233,560 B1* | 5/2001 | Tannenbaum .............. 704/275 |
| 6,308,157 B1* | 10/2001 | Vanbuskirk et al. ........ 704/275 |
| 6,456,972 B1* | 9/2002 | Gladstein et al. ........... 704/257 |
| 6,606,598 B1* | 8/2003 | Holthouse et al. .......... 704/275 |
| 6,606,599 B1* | 8/2003 | Grant et al. ............... 704/275 |
| 6,697,777 B1* | 2/2004 | Ho et al. ................... 704/235 |
| 2002/0026320 A1* | 2/2002 | Kuromusha et al. ........ 704/270 |
| 2002/0055844 A1* | 5/2002 | L'Esperance et al. ....... 704/260 |
| 2002/0077830 A1* | 6/2002 | Suomela et al. ............ 704/275 |
| 2002/0169616 A1* | 11/2002 | Brooks et al. .............. 704/275 |
| 2002/0169617 A1* | 11/2002 | Luisi ........................ 704/275 |
| 2004/0249640 A1* | 12/2004 | Grant et al. ................ 704/249 |
| 2005/0049880 A1* | 3/2005 | Roth et al. ................. 704/277 |

* cited by examiner

*Primary Examiner*—David Hudspeth
*Assistant Examiner*—Matthew J. Sked
(74) *Attorney, Agent, or Firm*—Akerman Senterfitt

(57) ABSTRACT

The present invention provides a method of dynamically displaying speech recognition system information. The method can include providing a single floating window for displaying frames of speech recognition system state information to a user. The frames can be varied according to trigger events detected in the speech recognition system. Each frame can differ from others of the frames according to the speech recognition system state information.

17 Claims, 4 Drawing Sheets

METHOD OF DYNAMICALLY DISPLAYING SPEECH RECOGNITION SYSTEM INFORMATION

BACKGROUND OF THE INVENTION

1. Technical Field

This invention relates to the field of speech recognition, and more particularly, to a user interface to a speech recognition system.

2. Description of the Related Art

A conventional speech recognition system (SRS), whether used as a stand-alone system or as an integrated component of another application program, can provide users with a large amount of information relating to the operation and usage of the SRS. For example, a SRS can provide users with different word alternatives, various help screens, listings of available speech commands, as well as historical information relating to the current speech recognition session. Typically, information provided by the SRS can be displayed within a series of floating windows. Often, each window is used to present a particular view, which in turn displays particular information relating to that view. For example, one floating window can display a correction view wherein alternate words are presented; a second floating window can display a help view wherein one or more possible speech commands are presented; and yet a third floating window can display a history view wherein previously used speech commands are presented. Additional floating windows can be used to display other views and other information associated with the SRS.

The technique of using multiple floating windows to provide users with information, however, can have several disadvantages. One disadvantage arises from the fact that floating windows typically exist in a layer above all other windows, including the primary application window, i.e. the dictation window or main workspace of a speech-enabled application. Accordingly, when open, floating windows cover large portions of the screen thereby obscuring the underlying view of the workspace. As more floating windows are displayed, less of the underlying view can be seen by the user. Although multiple floating windows can waste screen real estate and result in a significant amount of "screen clutter", oftentimes a floating window must be open for a user to access the information or functionality associated with that particular floating window.

SUMMARY OF THE INVENTION

The present invention provides a method and system for providing speech recognition system (SRS) information through a single view or frame, whose content can be dynamically updated in accordance with a trigger event within the SRS. In particular, the invention can provide a single floating window, the contents of which can be dynamically updated according to particular user inputs, actions, as well as the operational state of the SRS or speech-enabled application. Accordingly, the present invention can significantly reduce screen clutter arising from the use of multiple windows while still providing users with needed information.

One aspect of the present invention can include a method of dynamically displaying SRS information. The method can include providing a single floating window for displaying frames of SRS state information to a user. The frames can be varied according to trigger events detected in the SRS. Notably, each frame can differ from others of the frames according to the SRS state information.

The method further can include detecting a trigger event in the SRS. Responsive to the trigger event, the single floating window can be dynamically updated according to the trigger event. Each of the trigger events can specify one of a plurality of context dependent frames. The updating step also can include changing the context dependent frame in the single floating window to a context dependent frame corresponding to the detected trigger event. The frame can include selected items of SRS state information. Accordingly, the method can include determining at least one of the selected items of SRS state information to be included in the context dependent frame which is associated with the detected trigger event. The trigger event can be a change in an operational state of the SRS, a user selection of text in a primary view of the SRS, a user command to initiate a function in the primary view, and a location of a pointer in the primary view. The selected items of speech recognition state information can include a list of available speech commands, a list of alternate text selections, and a list of commands previously issued by a user.

Another aspect of the present invention can include a single graphical user interface configured to display all context dependent frames of selected items of SRS state information in a SRS. The single graphical user interface is further configured to dynamically present selected ones of the plurality of context dependent frames responsive to at least one trigger event. The selected items of SRS state information can include a list of available speech commands, a list of alternate text selections, and a list of commands previously issued by a user. The trigger event can include a change in an operational state of a SRS, a user selection of text, a user command, and a location of a pointer.

Another aspect of the invention can include a SRS having a primary view and a separate single graphical user interface configured to display all context dependent frames of selected items of SRS state information in the SRS. The separate single graphical user interface further can be configured to dynamically present selected ones of the plurality of context dependent frames responsive to at least one trigger event.

BRIEF DESCRIPTION OF THE DRAWINGS

There are shown in the drawings embodiments which are presently preferred, it being understood, however, that the invention is not so limited to the precise arrangements and instrumentalities shown.

DETAILED DESCRIPTION OF THE INVENTION

The invention disclosed herein provides a method and system for providing speech recognition system (SRS) information through a single user interface which can be dynamically updated responsive to predetermined trigger events. In particular, the invention can provide a single graphical user interface (GUI) configured to display multiple views, or frames, of SRS information. Responsive to the trigger events, which can include particular user inputs, actions, as well as the operational state of the SRS, the frames presented in the single GUI, and the contents of these frames, can be dynamically updated.

Figure 1:
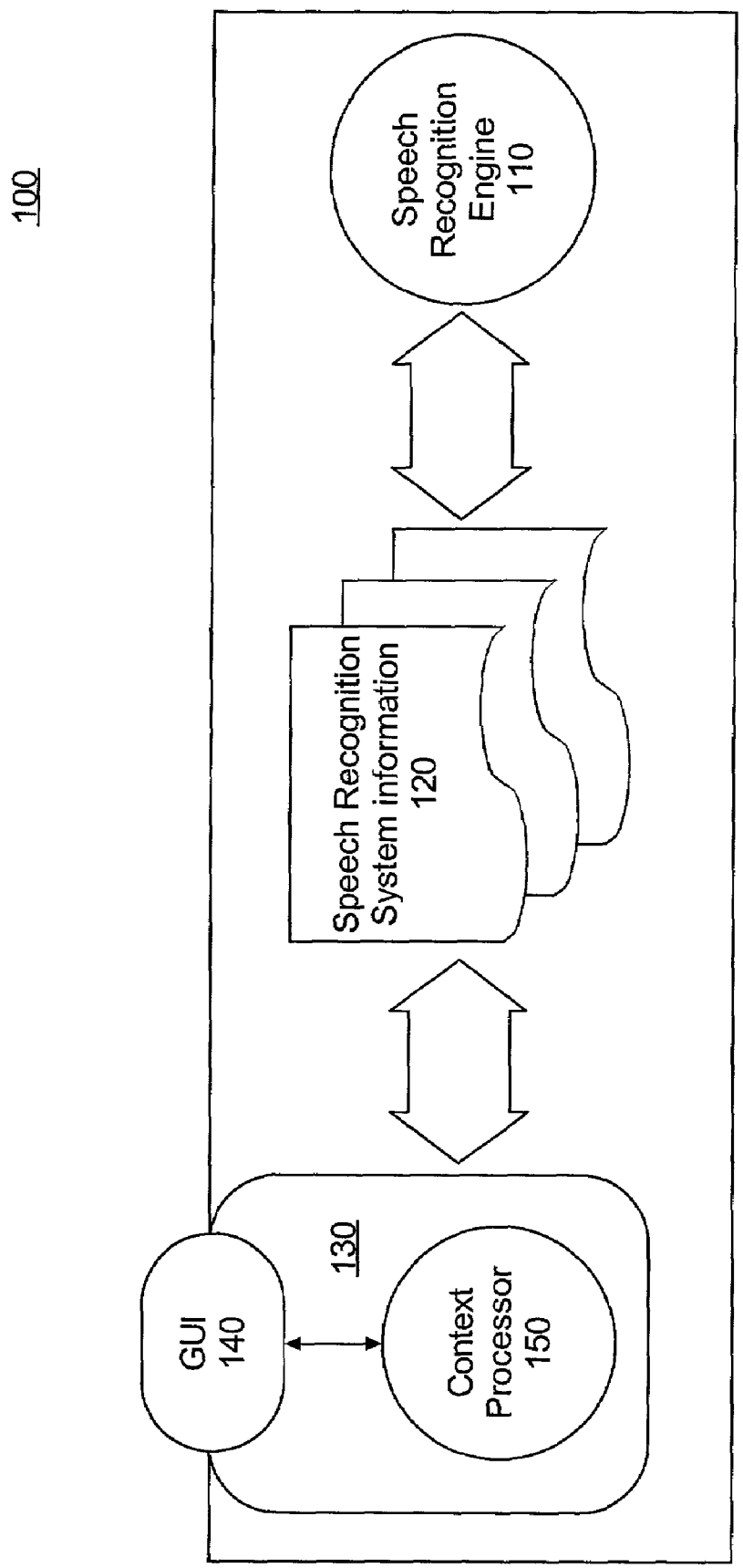
FIG. 1 is a schematic diagram illustrating a high level architecture of a system that can be used with the inventive arrangements disclosed herein.

FIG. 1 is a schematic diagram illustrating an exemplary SRS 100 which can be used with the inventive arrangements disclosed herein. As shown in FIG. 1, the SRS 100 can include a speech recognition engine 110, SRS information 120, and a context component 130. As is well known in the art, the speech recognition engine 110 can convert digitized speech to text. For example, the speech recognition engine 110 can perform an acoustic analysis upon the digitized speech to identify one or more potential text or word candidates. The speech recognition engine 110 further can perform a contextual or linguistic analysis upon the potential word candidates to determine a final text representation of the digitized speech signal.

The SRS information 120 can include any necessary acoustic and linguistic models, as well as other information used by the speech recognition engine 110 in converting digitized speech to text. For example, the SRS information 120 can include, but is not limited to, a recognizable vocabulary, valid speech command lists, alternative words or text corresponding to recognized words, and historical information relating to the current speech recognition session including a record of previously used speech commands, recognized words, previous text corrections, and the like. Still, other information such as the current operating state of the SRS 100, for example whether the SRS is in a dictation mode, a correction mode, a training mode, or a user feedback mode, can be included within the SRS information 120. The operating state further can include the location of a user within an allowable or valid command chain or sequence within each of the aforementioned operating states, as well as the location of a cursor or pointer within the primary view or workspace of the SRS or speech-enabled application.

The context component 130 can include a single GUI 140 and a context processor 150. The single GUI 140 can be a single floating window configured to dynamically provide various contextually relevant frames and items of SRS information to a user during a speech recognition session. The context processor 150 can access the SRS information 120 as well as receive user input via the single GUI 140 to detect various trigger events during the speech recognition session. Responsive to the trigger events, the context processor 150 can determine a contextually relevant frame and selected items of SRS information which can be provided to the single GUI 140.

Notably, the term "trigger events", as used herein, can include predetermined user actions and changes in the operating state of the SRS, whether such state changes occur automatically or responsive to a particular user action. For example, a change from one state to another, such as from a dictation mode to a correction mode as previously discussed, can be a trigger event.

User action trigger events can include any user action or input which either causes the SRS operating state to change, or which has been determined through an empirical analysis of user actions to indicate a user desired state change. Accordingly, user action trigger events can include speech commands such as "correction" as well as non-speech commands such as selecting a correction mode using a pointer. Other types of user action trigger events can include user selection of text as an indication of a correction mode and the placement of a cursor within a dictation window as an indication of a dictation mode. Regardless of the type of trigger event, each trigger event can be associated with a particular frame and particular items of SRS information to be presented within that frame.

It should be appreciated that each of the GUI 140, the context processor 150, the SRS information 120, and the speech recognition engine 110 can be incorporated within a single application program, can exist as separate application programs, or in various combinations thereof. Accordingly, in one embodiment of the present invention, the context component 130 can be incorporated within the speech recognition engine 110. Moreover, the SRS 100 itself can be incorporated within a larger application, or used with an application to be speech-enabled.

Figure 2:
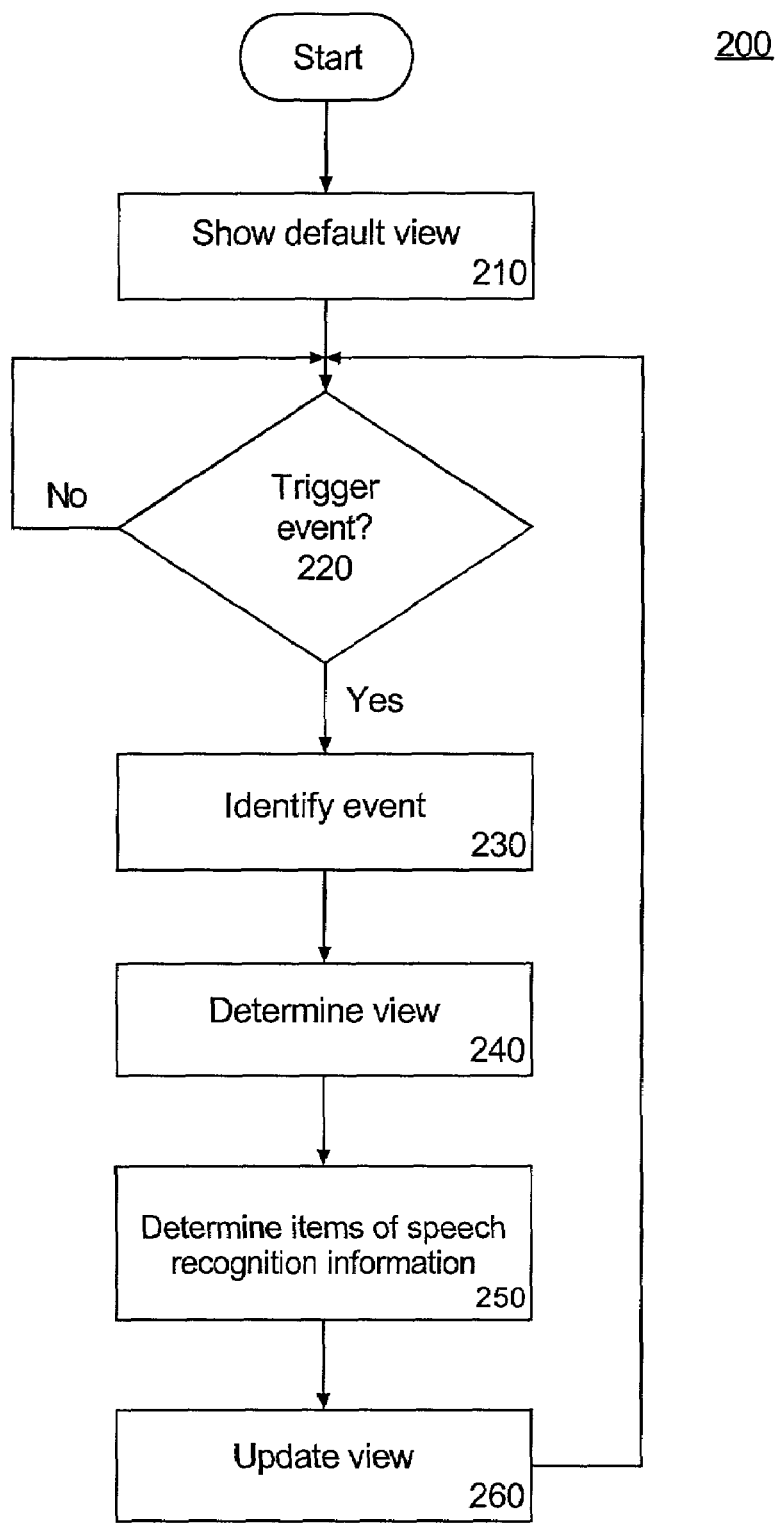
FIG. 2 is a flow chart illustrating a method of dynamically presenting information in accordance with the inventive arrangements disclosed herein.

FIG. 2 is a flow chart 200 illustrating an exemplary method of dynamically presenting SRS information in accordance with the inventive arrangements disclosed herein. The method can begin in a state where a speech recognition session has been initiated and a primary application window or view has been displayed. Also, a single floating window, for example GUI 140, can be provided for displaying contextually relevant SRS information to the user. Accordingly, in step 210, a default frame can be displayed in the single GUI 140. The default frame can be a predetermined frame or can be a frame which was saved from a previous speech recognition session. After completion of step 210, the method can continue to step 220.

In step 220, the SRS can await a trigger event. As shown in FIG. 2, the method can continually loop through step 220 until a trigger event is detected. Once a trigger event has been detected, the method can continue to step 230. In step 230, the trigger event can be identified. More specifically, the SRS can identify whether the trigger event was a user action or a change in the operational state of the SRS. The SRS further can identify the type of user action, for example, whether the trigger event was a command, a selection of text, or a cursor placement. After completion of step 230, the method can continue to step 240.

In step 240, a frame corresponding to the identified event can be determined. For example, each of the trigger events can be associated with a particular frame which can be displayed within the single GUI. Accordingly, once an event has occurred, the frame associated with that event can be identified. In illustration, the following is a non-exhaustive listing of possible trigger events and associated exemplary frames: a user highlighting text can be associated with a correction frame for correcting the highlighted text; the placement of a cursor within a dictation window can be associated with a command frame for displaying valid or allowable speech commands; and a speech command such as "history" can be associated with a history frame wherein previous speech commands can be displayed. After completion of step 240, the method can continue to step 250.

In step 250, one or more items of SRS information can be determined based upon the identified frame and trigger event. For example, if text has been selected and a correction frame has been identified, one or more alternate text selections corresponding to the selected text can be determined. If the trigger event corresponds to a dictation mode, one or more suitable speech commands can be identified based upon the current operational state of the SRS as well as the most recent series of commands. After completion of step 250, the method can continue to step 260. In step 260, the frame presented in the single GUI can be updated as well as any items of SRS information in accordance with the trigger event and operational state of the SRS.

Figure 3:
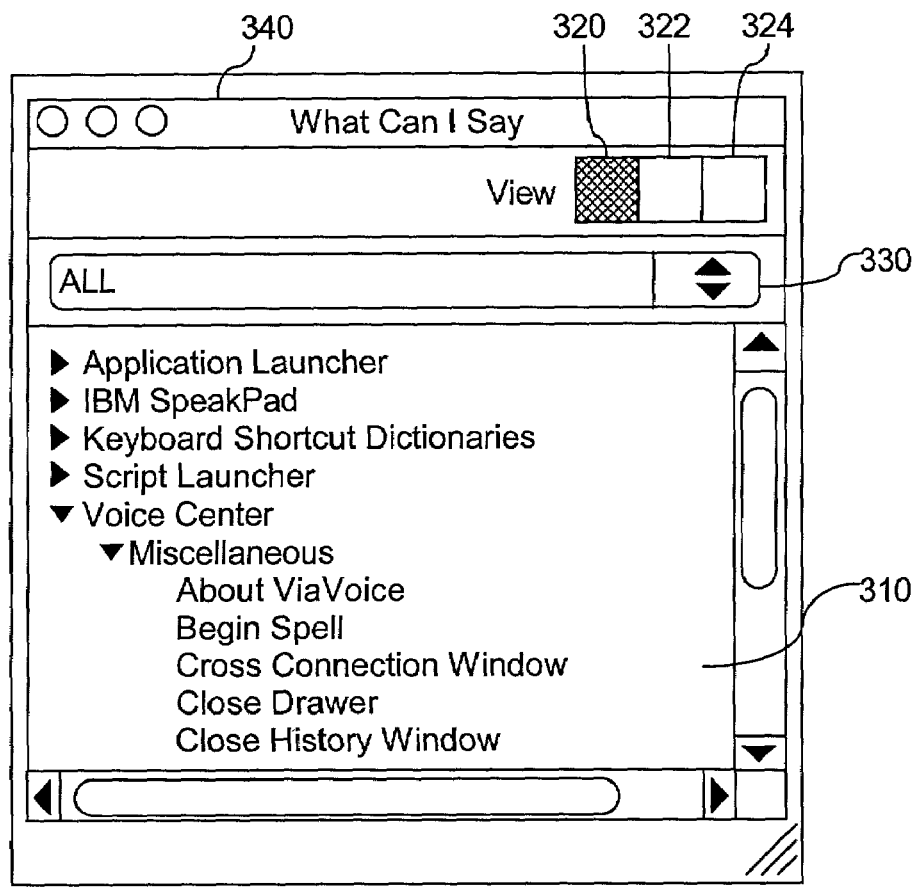
FIG. 3 is an exemplary graphical user interface which can be used in accordance with the inventive arrangements disclosed herein.

FIG. 3 illustrates an embodiment of the single GUI 140 wherein a command frame has been presented responsive to a trigger event. As shown in FIG. 3, single GUI 140 can include a window 310, a series of buttons 320, 322, and 324, a selector control 330, and a title bar 340. In the command frame, the title bar 340 has been dynamically updated to indicate the title of the frame being displayed. In this case, the frame is called the "What Can I Say View". Accordingly, the window 310 can display a listing of valid or allowable speech recognition commands based upon the present operational state of the SRS. Buttons 320, 322, and 324 also can provide an indication of the frame being presented in single GUI 140. Specifically, the particular button corresponding to the frame being presented, in this case button 320, can be highlighted. Additionally, each of the buttons 320, 322, and 324 can be selected by a user using a pointing device to manually switch among the various frames. The selector 330 allows users to manually filter the list of presented commands according to particular predetermined categories.

Figure 4:
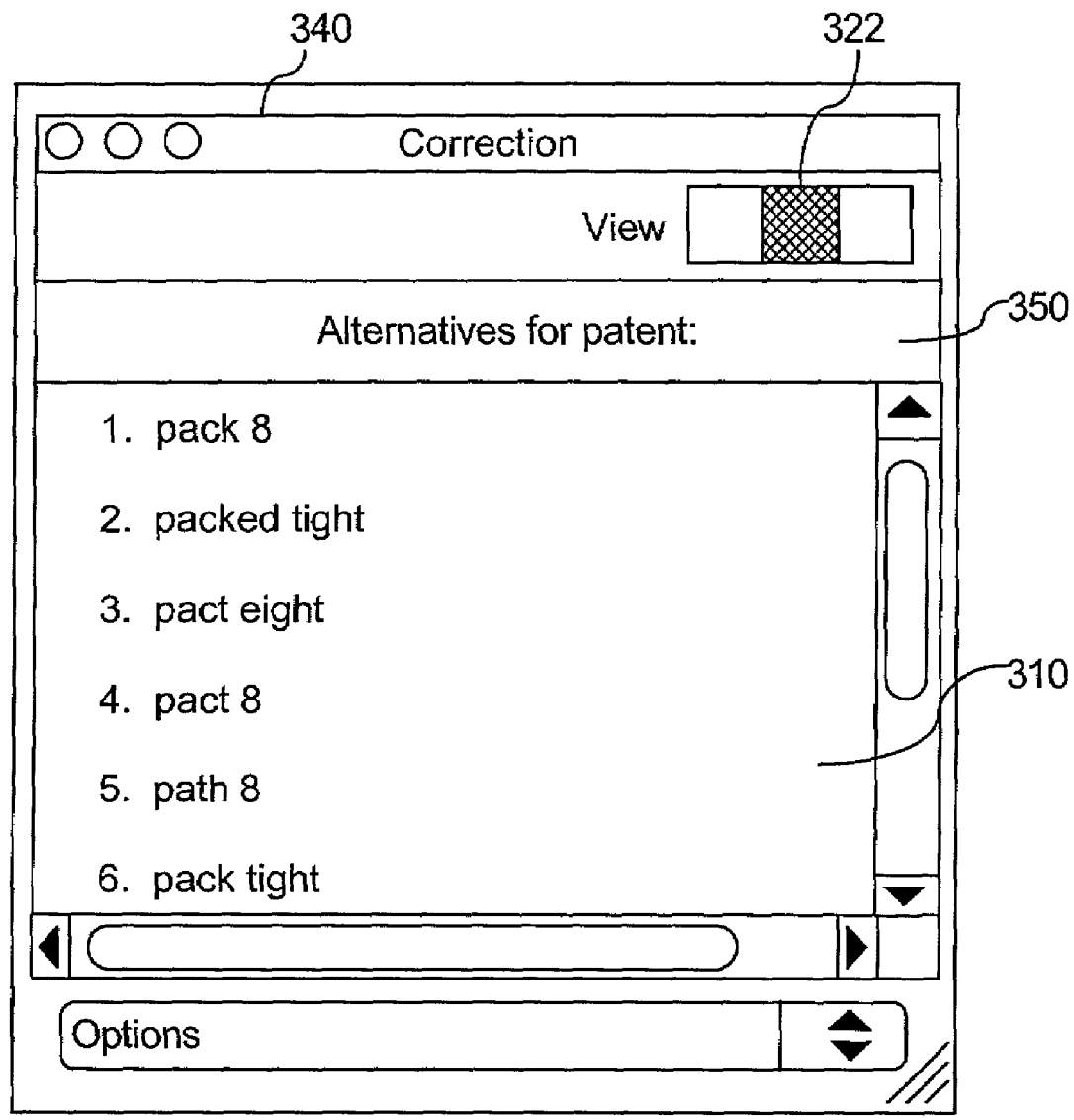
FIG. 4 is another exemplary graphical user interface which can be used in accordance with the inventive arrangements disclosed herein.

FIG. 4 illustrates another aspect of the single GUI 140 wherein a correction frame, as indicated by the title bar 340, has been presented responsive to a trigger event. As shown in FIG. 4, a user feedback section 350 has been included within the single GUI 140 which indicates that the user has selected the text "patent" within the primary view of the underlying application or workspace. Accordingly, window 310 has been updated with alternate text selections associated with the selected text "patent". Moreover, the correction button 322 has been selected or highlighted.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of dynamically displaying speech recognition system information comprising:
   providing a single floating window for displaying frames of speech recognition system state information to a user;
   performing an empirical analysis of a plurality of user actions and inputs to determine a plurality of different trigger events that cause operating states of the speech recognition system to change in response thereto; and
   dynamically updating said single floating window for individually and sequentially displaying said frames at different times, each individual display changing in response to said different trigger events detected in said speech recognition system, wherein each said individually displayed frame differs from others of said frames according to said speech recognition system state information, wherein the frames variably and individually displayed in the single floating window include a frame containing a list of valid speech recognition commands for a current speech recognition system state and a frame containing a list of alternative text selections for a previously spoken word for which a speech-recognition operation has been performed, wherein each variably and individually displayed frame is uniquely associated with a specific trigger event, and wherein at least one of said trigger events is an automatic user-independent event.

2. The method of claim 1, further comprising:
   detecting a trigger event in said speech recognition system; and
   responsive to said trigger event, dynamically updating said single floating window according to said trigger event.

3. The method of claim 2, wherein each of said trigger events specifies one of a plurality of context dependent frames.

4. The method of claim 3, said updating step comprising:
   changing said context dependent frame in said single floating window to a context dependent frame corresponding to said detected trigger event, wherein said context dependent frame includes selected items of speech recognition system state information.

5. The method of claim 4, further comprising:
   determining at least one of said items of speech recognition system state information to be included in said context dependent frame corresponding to said detected trigger event.

6. The method of claim 5, wherein at least one trigger event comprises one of a user selection of text in a primary view of said speech recognition system, a user command to initiate a function in said primary view, and a location of a pointer in said primary view.

7. The method of claim 5, wherein said selected items of speech recognition state information include a list of available speech commands, a list of alternate text selections, and a list of commands previously issued by a user.

8. A system for providing speech recognition system information, the system comprising:
   an empirical analyzer for performing an empirical analysis of a plurality of system user actions and inputs to determine a plurality of different trigger events that cause operating states of the speech recognition system to change in response thereto; and
   a single graphical user interface configured to display all context dependent frames of selected items of speech recognition system state information in said speech recognition system, wherein said single graphical user interface is further configured to dynamically and individually present at different times selected ones of said plurality of context dependent frames in response to said different trigger events detected in said speech recognition system, wherein at least one trigger event comprises an automatic user-independent event, wherein the context dependent frames dynamically presented in the single graphical user interface include a frame containing a list of valid speech recognition commands for a current speech recognition system state and a frame containing a list of alternative text selections for a previously spoken word for which a speech-recognition operation has been performed; and wherein each frame presented is uniquely associated with a specific trigger event and individually presented separate from other frames.

9. The graphical user interface of claim 8, wherein said selected items of speech recognition system state information include a list of available speech commands, a list of alternate text selections, and a list of commands previously issued by a user.

10. The graphical user interface of claim 8, wherein at least one trigger event comprises one of a change in an operational state of a speech recognition system, a user selection of text, a user command, and a location of a pointer.

11. A machine-readable storage, having stored thereon a computer program having a plurality of code sections executable by a machine for causing the machine to perform the steps of:
providing a single floating window for displaying frames of speech recognition system state information to a user;
performing an empirical analysis of a plurality of user actions and inputs to determine a plurality of different trigger events that cause operating states of the speech recognition system to change in response thereto; and
dynamically updating said single floating window for individually and sequentially displaying said frames at different times, each individual display changing in response to said different trigger events detected in said speech recognition system, wherein each said individually displayed frame differs from others of said frames according to said speech recognition system state information, wherein the frames variably and individually displayed in the single floating window include a frame containing a list of valid speech recognition commands for a current speech recognition system state and a frame containing a list of alternative text selections for a previously spoken word for which a speech-recognition operation has been performed, wherein each variably and individually displayed frame is uniquely associated with a specific trigger event, and wherein at least one of said trigger events is an automatic user-independent event.

12. The machine-readable storage of claim 11, said updating step comprising;
detecting a trigger event in said speech recognition system; and
responsive to said trigger event, dynamically updating said single floating window according to said trigger event.

13. The machine-readable storage of claim 12, wherein each of said trigger events specifies one of a plurality of context dependent frames.

14. The machine-readable storage of claim 13, said updating step comprising:
changing said context dependent frame in said single floating window to a context dependent frame corresponding to said detected trigger event, wherein said context dependent frame includes selected items of speech recognition system state information.

15. The machine-readable storage of claim 14, further comprising:
determining at least one of said items of speech recognition system state information to be included in said context dependent frame corresponding to said detected trigger event.

16. The machine-readable storage of claim 15, wherein at least one trigger event comprises one of a change in an operational state of said speech recognition system, a user selection of text in a primary view of said speech recognition system, a user command to initiate a function in said primary view, and a location of a pointer in said primary view.

17. The machine-readable storage of claim 15, wherein said selected items of speech recognition system state information include available speech commands, a list of alternate text selections, and a list of commands previously issued by a user.

* * * * *